US012586834B2

(12) United States Patent
Lee et al.

(10) Patent No.: US 12,586,834 B2
(45) Date of Patent: Mar. 24, 2026

(54) METHOD OF SELECTIVELY REMOVING ALUMINUM FROM WASTE ELECTRODE AND A METHOD OF REMOVING METAL COMPONENTS FROM THE WASTE ELECTRODE USING THE METHOD

(71) Applicant: LG Energy Solution, Ltd., Seoul (KR)

(72) Inventors: Jeongbae Lee, Daejeon (KR); Youngjoo Choi, Daejeon (KR); Jeong Kyu Kim, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 772 days.

(21) Appl. No.: 17/802,480

(22) PCT Filed: Jul. 27, 2021

(86) PCT No.: PCT/KR2021/009743
§ 371 (c)(1),
(2) Date: Aug. 25, 2022

(87) PCT Pub. No.: WO2022/025600
PCT Pub. Date: Feb. 3, 2022

(65) Prior Publication Data
US 2023/0099073 A1 Mar. 30, 2023

(30) Foreign Application Priority Data
Jul. 27, 2020 (KR) ........................ 10-2020-0093232

(51) Int. Cl.
*H01M 10/54* (2006.01)
*C22B 1/24* (2006.01)
*C22B 7/00* (2006.01)

(52) U.S. Cl.
CPC .............. *H01M 10/54* (2013.01); *C22B 1/24* (2013.01); *C22B 7/007* (2013.01)

(58) Field of Classification Search
None
See application file for complete search history.

(56) References Cited

U.S. PATENT DOCUMENTS

| | | | |
|---|---|---|---|
| 2011/0059339 A1 | 3/2011 | Yamasaki et al. | |
| 2017/0009358 A1 | 1/2017 | Shin et al. | |
| 2020/0232066 A1 | 7/2020 | Higaki et al. | |

FOREIGN PATENT DOCUMENTS

| | | |
|---|---|---|
| CN | 101450815 A | 6/2009 |
| CN | 102162034 A | 8/2011 |

(Continued)

OTHER PUBLICATIONS

English translation of CN 102162034 A Description. (Year: 2011).*

(Continued)

*Primary Examiner* — Anthony J Zimmer
*Assistant Examiner* — Zachary John Baum
(74) *Attorney, Agent, or Firm* — Bryan Cave Leighton Paisner LLP

(57) ABSTRACT

A method of removing aluminum from a waste electrode. The method includes comminuting the waste electrode containing a waste current collector and an electrode active material. The method further includes screening the comminuted waste electrode to collect the electrode active material. The method further includes mixing the electrode active material and an alkaline solution to remove aluminum impurities in the electrode active material.

11 Claims, 2 Drawing Sheets

(56) References Cited

FOREIGN PATENT DOCUMENTS

| CN | 102751549 | B | 12/2014 | |
| CN | 104868190 | A | 8/2015 | |
| CN | 105441682 | A | 3/2016 | |
| CN | 107732352 | A * | 2/2018 | ........... C22B 23/043 |
| CN | 109148996 | A | 4/2018 | |
| CN | 108677014 | A * | 10/2018 | ......... C22B 15/0093 |
| CN | 107910612 | A | 1/2019 | |
| CN | 110010990 | A * | 7/2019 | ........... H01M 4/366 |
| CN | 110323511 | A * | 10/2019 | ........... C22B 23/043 |
| CN | 110581323 | A | 12/2019 | |
| CN | 110620278 | A | 12/2019 | |
| JP | 2011-154833 | A | 8/2011 | |
| JP | 5269222 | B1 | 8/2013 | |
| JP | 2016-009613 | A | 1/2016 | |
| JP | 2019-169308 | A | 10/2019 | |
| KR | 10-0644902 | B1 | 11/2006 | |
| KR | 10-2010-0115817 | A | 10/2010 | |
| KR | 10-2011-0088356 | A | 8/2011 | |
| KR | 10-1254390 | B1 | 4/2013 | |
| KR | 10-1528507 | B1 | 6/2015 | |
| KR | 10-2020-0028033 | A | 3/2020 | |
| WO | WO-2016008813 | A1 * | 1/2016 | ............. C22B 7/005 |
| WO | WO-2018218358 | A1 * | 12/2018 | ............. C01D 15/02 |

OTHER PUBLICATIONS

English translation of CN-110323511-A Description. (Year: 2019).*

English translation of CN-110010990-A Description. (Year: 2019).*

English translation of CN-108677014-A Description. (Year: 2018).*

English translation of CN-107732352-A Description. (Year: 2018).*

R. H. Perry, "Perry's Chemical Engineers' Handbook," 7th Edition, McGraw-Hill, New York, 1997. (Year: 1997).*

European Supplementary Search Report, EP Patent Application No. 21850290.4, Jul. 31, 2023, 11 pages.

Choubey, Pankaj K. et al., "Advance review on the exploitation of the prominent energy-storage element Lithium. Part II: From sea water and spent lithium ion batteries (LIBs)," Minerals Engineering, vol. 110, Apr. 28, 2017, pp. 104-121.

Gratz, Eric et al.: "A closed loop process for recycling spent lithium ion batteries", Journal of Power Sources, vol. 262, Sep. 1, 2014, pp. 255-262.

* cited by examiner

【FIG. 1】
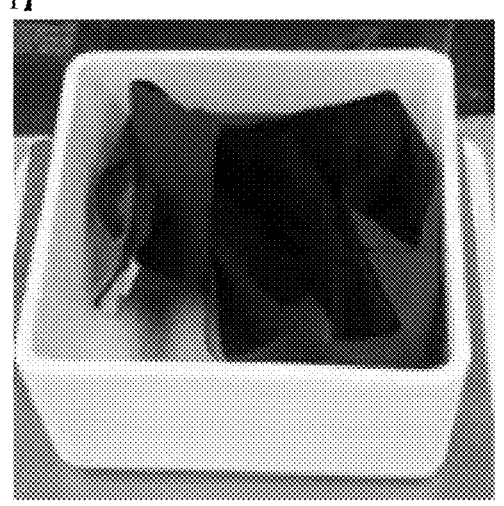
【FIG. 2】
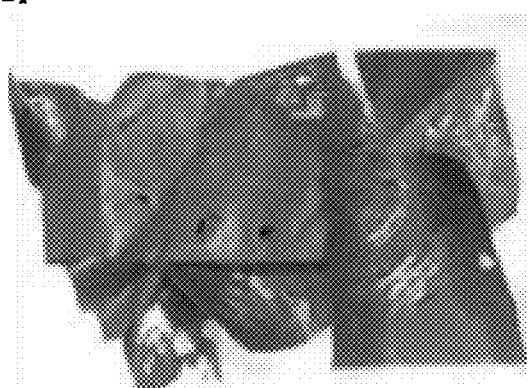

【FIG. 3】
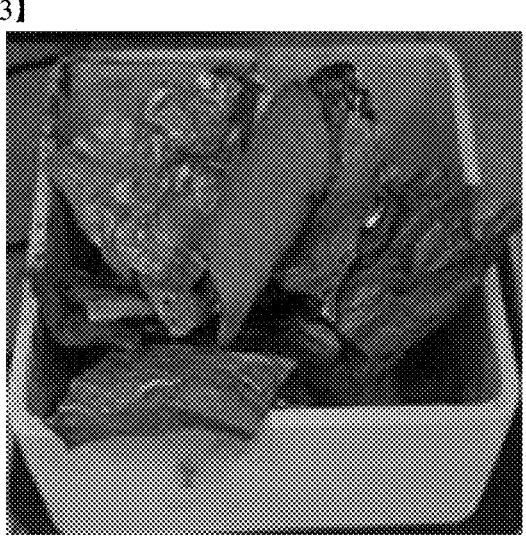

METHOD OF SELECTIVELY REMOVING ALUMINUM FROM WASTE ELECTRODE AND A METHOD OF REMOVING METAL COMPONENTS FROM THE WASTE ELECTRODE USING THE METHOD

CROSS-REFERENCE TO RELATED APPLICATION(S)

This application is a National Phase entry pursuant to 35 U.S.C. § 371 of International Application No. PCT/KR2021/009743 filed on Jul. 27, 2021, and claims priority to and the benefit of Korean Patent Application No. 10-2020-0093232 filed on Jul. 27, 2020 with the Korean Intellectual Property Office, the disclosure of which is incorporated herein by reference in its entirety.

The present disclosure relates to a method of selectively removing aluminum from a waste electrode and a method of removing a metal component from a waste electrode using the same.

BACKGROUND ART

A battery generates electric power by using a material that enables an electrochemical reaction between a positive electrode and a negative electrode. A typical example of such a battery is a lithium secondary battery that generates electrical energy by a change in chemical potential when lithium ions are intercalated/deintercalated in the positive electrode and the negative electrode.

Such a lithium secondary battery is manufactured by using a material capable of reversible intercalation/deintercalation of lithium ions as an electrode active material, and charging an electrolyte between the positive electrode and the negative electrode.

However, the metal constituting the electrode active material is expensive or its production capacity is often limited. For example, as the positive electrode active material, cobalt, manganese, nickel, or a combination thereof, i.e., a composite oxide of a metal and lithium, is used. Among them, nickel and cobalt are relatively expensive metals, and in particular, they correspond to metals where the production capacity of cobalt is limited.

Accordingly, in this technical field, research is being conducted on a method of separating a waste electrode from a waste battery, recovering an electrode active material from the waste electrode and recycling the waste electrode. Specifically, the electrode active material layer is scraped off from the current collector of the waste electrode to obtain an electrode active material powder, or the electrode active material powder can be recovered by using a comminution device, a screening device (physical separation), or the heat treatment can proceed first to separate the electrode active material from the waste electrode current collector (thermal separation). However, generally, the comminuting and screening steps are involved during thermal separation. Even by any of the methods, a method of removing the metal component of the recovered electrode active material by a method such as acid leaching or solvent extraction has been proposed.

However, although any method of physical separation or thermal separation is used, the components of the waste collector are inevitably mixed. After that, when leaching into the acid solution, the current collector component is dissolved together with the electrode active material component to coexist in the solution. For example, when the positive electrode current collector Al component coexists with Ni, Co, Mn, Li, etc. in the form of ions, the pH of the leachate is adjusted to form an Al salt, which is then precipitated/removed. During the process, however, there is a problem that metal components of the electrode active material, for example, Ni, Co, Mn, Li, etc. are co-precipitated and lost together with Al. Therefore, as the content of Al in the recovered electrode active material powder is minimized, it is advantageous in terms of process and economic.

SUMMARY

It is an object of the present disclosure to provide a method of selectively removing aluminum impurities in order to minimize the loss of metal components to be recovered.

According to the present disclosure, there is provided a method of selectively removing a current collector component (particularly, aluminum) from a waste electrode powder, and then leaching and recovering a metal component of an electrode active material.

Specifically, in one embodiment of the present disclosure, there is provided a method of comminuting and screening a waste electrode to recover an electrode active material, and then subjecting it to alkali treatment to selectively remove aluminum impurities in the electrode active material.

In another embodiment of the present disclosure, there is provided a method of selectively removing aluminum from a waste electrode using the method of the one embodiment, and then subjecting it to an acid leaching to recover a metal component of an electrode active material.

According to an embodiment of the present disclosure, a method of removing aluminum from a waste electrode is provided. The method may include the steps of: comminuting the waste electrode containing a waste current collector and an electrode active material; screening the comminuted waste electrode to collect the electrode active material; and mixing the electrode active material and an alkaline solution to remove aluminum impurities in the electrode active material. The electrode active material may be a positive electrode active material containing at least one transition metal of nickel (Ni), cobalt (Co) and manganese (Mn), and lithium (Li). The alkaline solution may be an aqueous solution containing sodium hydroxide (NaOH), potassium hydroxide (KOH), ammonium hydroxide (NH$_4$OH), or a mixture of two or more thereof. The alkaline solution may be a sodium hydroxide aqueous solution containing 2 to 15% by weight of sodium hydroxide (NaOH) and a remainder of water in the total amount of the sodium hydroxide aqueous solution. The mixing of the electrode active material and the alkaline solution may be performed at a temperature range of 15 to 80° C. The alkaline solution may be mixed in an amount of 500 to 900 parts by weight based on 100 parts by weight of the electrode active material. The mixing of the electrode active material and the alkaline solution may be performed for 5 to 100 minutes. Ultrasonic waves may be applied when mixing the electrode active material and the alkaline solution. The step of comminuting the waste electrode may include sequentially comminuting the waste electrode using a shredder, a high-speed milling machine, and an ultra-high-speed milling machine. The step of screening the comminuted waste electrode to collect the electrode active material may include collecting the electrode active material from the comminuted waste electrode by using a particle size screening device equipped with a 25 to 70 mesh sieve.

According to an embodiment of the present disclosure, a method of removing a metal component from a waste electrode may be provided. The method may include the steps of: comminuting the waste electrode containing a waste current collector and an electrode active material; mixing the electrode active material and an alkaline solution to remove aluminum impurities in the electrode active material; and leaching metal ions by adding an acid to the electrode active material from which the aluminum impurities have been removed. The acid added in the leaching step may be an aqueous acid solution containing water and one of more acids selected from the group consisting of sulfuric acid, nitric acid and hydrochloric acid. The acid in the aqueous acid solution may be added at a ratio of 1 to 5 equivalents with respect to a transition metal contained in the electrode active material. The leaching step may be performed at a temperature range of 30 to 100° C. The leaching step may be performed for 30 to 300 minutes.

BRIEF DESCRIPTION OF THE DRAWINGS

FIG. 1 is an image of a waste positive electrode containing $LiNi_{0.6}Co_{0.2}Mn_{0.2}O_2$ as a positive electrode active material;

FIG. 2 is an image taken after obtaining a positive electrode active material powder by scraping off the positive electrode active material layer from the current collector (Al foil) of the waste positive electrode in Reference Example 1; and FIG. 3 is an image taken after obtaining the positive electrode active material powder by heat-treating the waste positive electrode in Reference Example 2 and then lightly shaking off the heat-treated positive electrode active material layer.

DETAILED DESCRIPTION

The term provided herein is merely used for the purpose of describing particular embodiments only, and is not intended to be limiting of the present disclosure. The singular forms "a," "an," and "the" are intended to include the plural forms as well, unless the context clearly indicates otherwise. It will be further understood that the terms "comprise", "include", "have", etc. as used herein, specify the presence of stated features, integers, steps, constitutional elements and/or combinations thereof but do not preclude the presence or addition of one or more other features, steps, constitutional elements, and/or combinations thereof. In the drawings, the thickness of various layers and regions are exaggerated for clarity. Like reference numerals designate like elements throughout the description. When an element such as a layer, film, region, or plate is referred to as being "on" or "above" another element, includes not only cases where it can be directly on the other element but also cases where intervening elements can also be present. In contrast, when an element is referred to as being "directly on" another element, it means that other intervening elements are not present.

Hereinafter, embodiments of the present disclosure will be described in detail. However, the embodiments are presented for illustrative purposes only, and the present disclosure is not limited thereto, and the present disclosure is only defined by the scope of the claims described later.

Since the present disclosure can be modified in various manners and can have various forms, specific embodiments will be illustrated and described in detail below. However, this is not intended to limit the present disclosure to any specific disclosed form, it should be understood to include all modifications, equivalents and substitutes included in the spirit and scope of the present disclosure.

Hereinafter, an electrode for a secondary battery and a manufacturing method thereof according to specific embodiments of the present disclosure will be described in more detail.

Method of Selectively Removing Aluminum From Waste Electrode

In one embodiment of the present disclosure, there is provided a method of selectively removing aluminum from a waste electrode, the method comprising the steps of: comminuting the waste electrode containing a waste current collector and an electrode active material; screening the comminuted waste electrode to recover an electrode active material; and mixing the electrode active material and an alkaline solution to selectively remove aluminum impurities in the electrode active material.

Problems Concerning the Separation Method of the Current Collector and the Positive Electrode Active Material As pointed out above, when separating the electrode active material layer from the waste current collector, the current collector component is inevitably mixed even by any method of physical separation and thermal separation. Thus, in the removal step after acid leaching, the current collector component can be co-precipitated together with the metal component of the electrode active material such as Ni, Co, Mn, and Li. This is also confirmed in Experimental Examples described later.

Problems Concerning Heat Treatment

In particular, since the conductive material and the binder are oxidized and decomposed during heat treatment in the presence of oxygen, the thermal separation is for facilitating the separation of the electrode active material layer from the waste current collector and, at the same time, removing the conductive material and the binder.

By the way, the electrode active material in the waste electrode before heat treatment shows hydrophobicity, but the electrode active material after the conductive material and the binder have been removed along with the separation of the waste current collector by the heat treatment has relatively increased hydrophilicity.

Since the waste current collector components partially migrates to the electrode active material during the thermal separation, it is still necessary to remove the waste collector component by adding an alkaline solution after acid leaching. However, the electrode active material having relatively increased hydrophilicity can also be dissolved in an alkaline solution and removed together with the waste current collector component.

This also applies to the case where the physically separated positive electrode active material is heat-treated and then subjected to alkali treatment and an acid leaching in sequence. The physically separated positive active material contains a conductive material and a binder, but while the conductive material and the binder being removed during the heat treatment, the hydrophilicity of the electrode active material is relatively increased. When the alkali treatment is performed in this state, the waste collector components are selectively removed, and at the same time, the electrode active material having relatively increased hydrophilicity can also be dissolved in the alkaline solution and removed together with the waste collector components.

Therefore, in a series of steps of recovering the metal component of the waste electrode active material from the waste current collector, it is necessary to avoid heat treatment.

Problems Caused by Alkali Treatment of Waste Battery Itself

On the other hand, a method can be considered in which the waste battery is immersed in a specific aqueous solution and completely discharged to prevent a short circuit during handling, then remove a case and a lead tab terminal, and only the aluminum (Al) current collector is selectively dissolved by utilizing an alkaline solution such as a sodium hydroxide (NaOH) aqueous solution.

However, since the positive electrode, the negative electrode, and the separator in the waste battery are in a stacked or wound form, there is no choice but to slow down the penetration and diffusion of the alkaline solution. Therefore, it is not easy to completely melt the aluminum (Al) current collector.

Further, even if the aluminum (Al) current collector is selectively and completely melted, the step of washing the residue (solid matter) will be essentially required, and the washing step will generate a waste liquid containing a large amount of component such as sodium (Na) and aluminum (Al).

If the aluminum (Al) component is not completely removed in the washing step, the aluminum (Al) component will be contained in the final strong acid leachate. Thus, a pH change step of further removing the aluminum (Al) component is required, wherein a loss of metal components (particularly, Ni, Co, Mn, Li) of the electrode active material will be induced.

Problems Concerning Comminution and Screening of Waste Electrodes

A method can be considered in which without separating the electrode active material layer from the waste current collector, the waste electrode is comminuted and screened to recover the electrode active material, which is then subjected to a chemical treatment, particularly an acid leaching, to recover the metal component of the electrode active material.

Here, the waste electrode is comminuted and then the comminuted waste current collector material and electrode active material can be separated by using a screening device. This utilizes the shearing force of the screening device and the ductility and malleability of the waste collector component (particularly, aluminum).

However, in the comminution step, the comminuted waste collector material with a diameter of 1 mm or less can be mixed. When acid is leached in this state, the current collector component is leached together with the metal component of the electrode active material. In order to increase the acid leaching efficiency, hydrogen peroxide can be added, but eventually the same problem as the case where the electrode active material layer is physically separated from the waste current collector and then subjected to an acid leaching may occur.

Advantages of Alkali Treatment After Comminution and Screening of Waste Electrodes In one embodiment, in order to solve the problems of the methods pointed out above, the waste electrode is comminuted and screened to recover the electrode active material, and then subjected to alkali treatment to selectively remove aluminum impurities in the electrode active material.

The one embodiment utilizes the leaching reaction speed. By comminuting and screening the to waste electrode, the electrode active material shows hydrophobicity, the dissolution rate in an alkaline solution is slow, and the current collector component (particularly, aluminum) can be selectively dissolved and removed in the alkaline solution.

When an acid is added in a state where the current collector component (particularly, aluminum) has been selectively removed in this way, the metal component of the electrode active material can be recovered with a high recovery rate without an additional impurity removing step.

Hereinafter, the one embodiment will be described in more detail.

Waste Battery and Waste Electrode

In the present disclosure, the waste electrode includes an electrode in which a defect has occurred in the secondary battery manufacturing process, an electrode separated from the secondary battery discarded after use, and the like. Specifically, the waste electrode may be, for example, those in which coating defects occur during electrode active material slurry coating or do not reach the standard, or electrodes that have exceeded the effective period set at the time of storage among the completed electrodes.

The waste electrode may be a positive electrode or a negative electrode, but in consideration of the economic efficiency and the like, it can be a positive electrode with a large profit associated with recycling of active materials.

Specifically, the waste electrode may include a current collector and an electrode active material layer formed on the current collector. The current collector may be a commonly used metal thin film used as an electrode current collector in the art. For example, when the waste electrode is a positive electrode, it may be an aluminum thin film, and when the waste electrode is a negative electrode, it may be a copper thin film.

Specifically, the waste electrode of the one embodiment may be a positive electrode, and the waste current collector may be an aluminum thin film. The electrode active material may be a positive electrode active material including at least one transition metal of nickel (Ni), cobalt (Co), and manganese (Mn); and lithium (Li).

A more detailed description thereof will be given later.

Alkaline Solution

The alkaline solution is added to a strong acid leachate. As the solution is added, the pH can be increased to 4~5 levels. At this time, since the aluminum ion forms a hydroxide salt and precipitates in the solution, the precipitate can be removed through an additional filtration step.

Specifically, the alkaline solution may be an aqueous solution containing sodium hydroxide (NaOH), potassium hydroxide (KOH), ammonium hydroxide (NH$_4$OH), or a mixture of two or more thereof.

For example, it may be an aqueous solution containing sodium hydroxide (NaOH), which is a strong base.

Concentration and Mixing Amount of Alkaline Solution

The alkaline solution may be a sodium hydroxide aqueous solution containing 2 to 15% by weight of sodium hydroxide (NaOH) and the remainder of water in the total amount (100% by weight) of the alkaline solution.

If the concentration of the alkaline solution is too high, not only the current collector component but also the metal component of the electrode active material may be leached and lost. In contrast, if the concentration of the alkaline solution is too low, even the current collector component may be difficult to remove.

However, if the concentration is within the above range, the amount of leaching of aluminum (Al) may increase as the concentration of the alkaline solution increases at the same temperature and time.

For example, the alkaline solution may be a sodium hydroxide aqueous solution containing sodium hydroxide (NaOH) in an amount of 2% by weight or more, 3% by weight or more, 4% by weight or more, or 5% by weight or more, and 15% by weight or less, 14% by weight or less, 13% by weight or less, 12% by weight or less, 11% by weight or less, or 10% by weight or less.

The alkaline solution may be mixed in an amount of 500 to 900 parts by weight relative to 100 parts by weight of the electrode active material, based on the sodium hydroxide aqueous solution containing 2 to 15% by weight of sodium hydroxide (NaOH). When an alkaline solution having a lower concentration than the above is used, the weight of the alkaline solution may be increased.

On the other hand, when the amount of alkaline solution is increased by containing excess water even if the absolute amount of the alkaline substance in the alkaline solution is identical at the same temperature and time, there is nearly no change in the amount of leaching of the metal component of the electrode active material, and the amount of leaching of aluminum (Al), which is a current collector component, may be reduced.

In consideration of such a tendency, the mixing amount of the alkaline solution can be determined within the above range.

Mixing Temperature and Time of Alkaline Solution

The mixing of the electrode active material and the alkaline solution may be performed in a temperature range of 15 to 80° C. for 5 to 100 minutes.

If mixing is performed at an excessive temperature for a long time, there may be a problem that not only the current collector component but also the metal component of the electrode active material is leached together.

However, when the mixing is performed within the above range, as the mixing temperature becomes higher and the mixing time becomes longer, the amount of leaching of aluminum (Al) can be increased.

For example, the mixing of the electrode active material and the alkaline solution may be performed in a temperature range of 15° C. or more, 17° C. or more, 19° C. or more, or 22° C. or more, and 80° C. or less, 75° C. or less, 70° C. or less, or 65° C. or less; for 5 minutes or more, 7 minutes or more, or 10 minutes or more, and 100 minutes or less, 90 minutes or less, 80 minutes or less, 70 minutes or less, or 65 minutes or less.

Ultrasonic Treatment When Mixing Alkaline Solutions

When the electrode active material and the alkaline solution are mixed, ultrasonic waves may be applied.

Specifically, ultrasonic waves corresponding to a frequency of 20 to 40 kHz may be applied for 30 to 90 minutes.

However, the ultrasonic treatment is optional. When the alkali concentration, temperature, and treatment time are identical, there may be nearly no difference depending on the presence/absence of ultrasonic treatment.

Comminuting and Screening Step

The step of comminuting the waste electrode may be sequentially comminuting the waste electrode using a shredder, a high-speed milling machine (cutter mill), and an ultra-high-speed milling machine (pin mill) in that order.

Further, the step of screening the comminuted waste electrode to recover an electrode active material may be recovering (or collecting) the electrode active material from the comminuted waste electrode by using a particle size screening device equipped with a 25 to 70 mesh sieve.

Here, the driving conditions of each device may be set as follows, but this is only an example and can be changed according to the common sense in the art:

Comminution machine: Shredder (feeding positive electrode scrap at a processing speed of 130 to 170 kg per hour), rotating at 5 to 15 Hz High-speed milling machine: Cutter mill (feeding a positive electrode scrap at a processing speed of 30 to 70 kg per hour), rotating at 700 to 900 Hz Ultra-high-speed milling machine: Pin mill (=fine impact mill), (feeding a positive electrode scrap at a processing speed of 25 to 35 kg per hour), rotating at 4000 to 6000 Hz Particle size screening device: Twist Screen (feeding a positive electrode scrap at a processing speed of 10 to 20 kg per hour) equipped with a 25 to 35 mesh sieve in the first stage and a 55 to 70 mesh sieve in the second stage Method of Removing Metal Component from Waste Electrode In another embodiment of the present disclosure, there is provided a method of removing a metal component from a waste electrode, the method comprising the steps of: comminuting the to waste electrode containing a waste current collector and an electrode active material; screening the comminuted waste electrode to recover (or collect) an electrode active material; mixing the electrode active material and an alkaline solution to selectively remove aluminum impurities in the electrode active material; and leaching metal ions by adding an acid to the electrode active material from which the aluminum impurities have been removed.

This corresponds to a method of removing a metal component of an electrode active material with a high recovery rate without an additional impurity removing step by adding an acid in a state in which the current collector component (particularly, aluminum) has been selectively removed in accordance with the method of the one embodiment described above.

Hereinafter, a description overlapping with the above-mentioned contents will be omitted, and the metal component recovery method of the one embodiment will be described in detail.

Acid Leaching Step

In the step of leaching metal ions by adding an acid to the electrode active material from which the aluminum impurity has been removed, an acidic aqueous solution containing sulfuric acid, nitric acid, hydrochloric acid, or a mixture of two or more thereof may be added.

The acidic aqueous solution may have a pH of 0 to 4, specifically 0.5 to 2. When the pH of the acidic aqueous solution satisfies the above range, the leaching efficiency of the metal component may be excellent. When this is converted to the concentration in a unit of % by weight, the acidic solution may include 3 to 20% by weight of sulfuric acid, nitric acid, hydrochloric acid, or a mixture of two or more thereof, and the remainder of water, in the total amount of the aqueous acid solution (100% by weight).

The acid in the aqueous acid solution may be included in an equivalent ratio of 1 to 5 equivalents, specifically 1.5 to 3 equivalents, with respect to the transition metal included in the electrode active material.

The step of leaching metal ions by adding an acid to the electrode active material from which the aluminum impurities have been removed may be performed at a temperature of 30 to 100° C., specifically 50 to 90° C.

The step of leaching metal ions by adding an acid to the electrode active material from which the aluminum impurity has been removed may be performed for 30 to 300 minutes, specifically, 60 to 180 minutes.

If the leaching time is too short or the leaching temperature is low, the metal component is not sufficiently leached, and if the leaching time is too long or the leaching temperature is high, the economic efficiency may be compromised.

Separation by Metal Component

A leachate containing a metal component contained in the electrode active material may be obtained by the acid leaching step.

After obtaining the leachate, the steps of extracting and stripping the metal component from the leachate from which the metal component has been leached, and purifying the stripping solution to crystallize it in the form of a metal salt may be further performed.

For example, when sulfuric acid is used in the acid leaching step, it can be obtained in the form of a salt in which a cation of a metal component and a sulfate anion ($SO_4^{2-}$) are bonded.

First, the leachate is passed through a filter containing micropores to filter suspended matter and impurities in the leachate. The filtration may be performed by a method of vacuum filtering the leachate using a filter or the like to which a vacuum pump is connected.

The filtration step can be performed one or more times, and for example, can be performed repeatedly about 2 to 6 times.

Then, for example, an organic solvent extractant is added to the filtrate obtained by the filtration step, the pH is adjusted, and the transition metal component is separated/extracted and recovered. After the transition metal component is extracted, $Na_2CO_3$ or NaOH is added to the remaining filtrate to recover the Li metal component.

Specifically, separation/extraction of the transition metal component can be performed by adding an organic solvent extractant to the filtrate obtained by the filtration step, and adding an alkaline solution such as NaOH to stepwise increase the pH.

At this time, as the organic solvent extractant, an organic solvent extractant generally used in the art, for example, a phosphate-based organic solvent extractant can be used, but is not limited to thereto.

On the other hand, since the extraction efficiency of Mn, Co, and Ni ions is different depending on the pH of the solution, each transition metal component can be separated and recovered by stepwise increasing the pH as described above.

For example, when the acidic aqueous solution is a sulfuric acid aqueous solution and a phosphate-based organic solvent extractant is used, $Mn^{2+}$ ions can be extracted under the condition of pH 3~5. $Co^{+2}$ ions can be extracted under the conditions of pH 2~5.5, and $Ni^{+2}$ ions can be extracted under the conditions of pH 6~7.5.

Further, when the acidic aqueous solution is an aqueous hydrochloric acid solution, and a phosphate-based organic solvent extractant is used, $Co^{+2}$ ions can be extracted under the conditions of pH 2.5~5, and $Ni^{+2}$ ions can be extracted under the conditions of pH 4~7.

Then, the organic solution containing the transition metal component (hereinafter, referred to as the transition metal extract) is separated from the acidic aqueous solution through phase separation, and the transition metal component is stripped from the transition metal extract to obtain a stripping solution. At this time, the transition metal stripping step can be performed by a method well known in the art, and the method is not particularly limited. For example, the stripping step can be performed through a method of adding an acidic aqueous solution such as an aqueous sulfuric acid solution to the transition metal extract to perform the ion exchange.

The stripping solution obtained as above is concentrated and purified by a method such as drying under reduced pressure to obtain a powder in which the corresponding transition metal component is crystallized in the form of a metal salt such as sulfide, chloride, or nitride.

The concentration is preferably performed at a temperature and pressure just before the stripping solution is boiled. For example, the concentration can be performed at a temperature of 70~80° C. and a pressure of 100~300 mbar, but is not limited thereto.

In the filtrate remaining after the transition metal is extracted through the above step, a Li component and a metal component such as Na derived from an alkaline solution are present in a mixed state. The lithium component can be separated by adding $Na_2CO_3$ or NaOH to the filtrate. Specifically, after the transition metal is extracted, $Na_2CO_3$ is added to the remaining filtrate to precipitate the Li component in the form of $Li_2CO_3$, which is crystallized, and then filtered to obtain lithium carbonate. Alternatively, NaOH is added to the filtrate, and the produced $Na_2SO_4$ is cooled, crystallized and removed to obtain a lithium salt in the form of lithium hydroxide.

By performing the steps as described above, a metal salt which is a raw material of the electrode active material, for example, a lithium salt, a nickel salt, a manganese salt, a cobalt salt and the like can be obtained, and these obtained products can be recycled as raw materials for electrode active materials.

Positive Electrode Active Material

As mentioned above, the electrode active material may be a positive electrode active material containing at least one transition metal of nickel (Ni), cobalt (Co) and manganese (Mn), and lithium (Li).

As a specific example, a compound represented by any one of the following chemical formulas may be used. $Li_aA_{1-b}Co_bR_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, $0 \leq c \leq 0.05$); $Li_aNi_{1-b-c}Co_bR_cD_\alpha$(wherein, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$(wherein, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cD_\alpha$, (wherein, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 \leq \alpha \leq 2$); $Li_aNi_bE_cG_dO_2$ (wherein, $0.90 \leq a \leq 1.8$, $0 \leq b \leq 0.9$, $0 \leq c \leq 0.5$ and $0.001 \leq d \leq 0.1$.); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ (wherein, $0.90 \leq a \leq 1.8$ and $0.001 \leq b \leq 0.1$.); $Li_aCoG_bO_2$ (wherein, $0.90 \leq a \leq 1.8$ and $0.001 \leq b \leq 0.1$.); $Li_aMnG_bO_2$ (wherein, $0.90 \leq a \leq 1.8$ and $0.001 \leq b \leq 0.1$.); $Li_aMn_2G_bO_4$ (wherein, $0.90 \leq a \leq 1.8$ and $0.001 \leq b \leq 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; and $LiFePO_4$.

In the above chemical formulas, A is Ni, Co, Mn, or a combination thereof, R is Al, Ni, Co, Mn, Cr, Fe, Mg, Sr, V, a rare earth element, or a combination thereof; D is O, F, S, P or a combination thereof; E is Co, Mn, or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu, or a combination thereof.

Of course, those having a coating layer on the surface of the compound can be used, or a mixture of the compound and a compound having a coating layer can be used. The coating layer is a coating element compound, which may include oxide, hydroxide, oxyhydroxide of a coating element, oxycarbonate of a coating element, or hydroxycarbonate of a coating element. The compound constituting these coating layers may be amorphous or crystalline. As the coating element contained in the coating layer, Mg, Al, Co, K, Na, Ca, Si, Ti, V, Sn, Ge, Ga, B, As, Zr, or a mixture thereof may be used. As the coating layer forming step, any coating method can be used as long as it can be coated by a method (for example, spray coating, dipping, and the like) that does not adversely affect the physical properties of the positive electrode active material by using these elements in the compound. Since this is the content that can be well understood by those engaged in the relevant field, a detailed description thereof is omitted.

Hereinafter, the present disclosure will be described with reference to examples, but these examples are provided for the sake of better understanding of the present disclosure, and the scope of the present disclosure is not limited thereto. Selective Removal Test of Al>

Experimental Example 1 (Problems Concerning the Separation Method of the Current Collector and the Positive Electrode Active Material)

Reference Examples 1 and 2

First, in Reference Example 1, a waste positive electrode (FIG. 1) containing $LiNi_{0.6}Co_{0.2}Mn_{0.2}O_2$ as a positive electrode active material was prepared, the positive electrode active material layer was scraped off from the current collector (Al foil) of the waste positive electrode to obtain a positive electrode active material powder. At this time, as shown in FIG. 2, a tearing phenomenon of the current collector (Al foil) occurred, and only about 10 g of the positive electrode active material powder could be recovered during the 30-minute operation.

Independently of this, in Reference Example 2, the same waste positive electrode as in Reference Example 1 was heated up to 550° C. at a temperature increase rate of 2° C./min and then heat-treated for 3 hours. The heat-treated positive electrode active material layer was then lightly shaken off to obtain a positive electrode active material powder. At this time, a positive electrode active material scrap could be obtained more easily than in Reference Example 1. FIG. 3 shows a current collector (Al foil) after separation of the positive electrode active material powder.

As a result of ICP-OES analysis of the recovered powder, about 1050 ppm of aluminum (Al) was detected. This is inferred as a result of thermal migration of aluminum particles to the positive electrode active material powder by heat.

Reference Example 3

In Reference Example 3, the same waste positive electrode as in Reference Example 1 was heated up to 550° C. at a temperature increase rate of 2° C./min, and then heat-treated for 3 hours. The heat-treated positive electrode scrap was then added to a cutter mill rotating at 800 rpm, then recovered, and then added to a pin mill rotating at 3000 rpm again, then comminuted, and screened with a particle size screening device equipped with a 30 and 60 mesh sieve in multiple stages. Thereby, the powder located at the lower stage of 60 mesh was recovered.

As a result of ICP-OES analysis of the recovered powder, about 4,800 ppm of aluminum (Al) was detected. This is inferred as a result of the aluminum particles being thermally migrated to the positive electrode active material powder and at the same time being further mixed into the comminuting step.

From these results, it can be seen that although any method of physical separation and thermal separation is used, the current collector (Al foil) component is inevitably contained in the positive active material separated from the current collector.

In particular, when the positive electrode active material is separated by heat treatment as in Reference Example 3 and then comminuted, the amount of aluminum mixed increases, so that the amount of the alkaline material used for removing it can be greatly increased. Further, as the amount of the alkaline material used increases, there is a risk that not only aluminum but also metal components (i.e., Li, Ni, Co, and Mn) of the positive electrode active material are lost together.

Experimental Example 2 (Problems Caused by Alkali Treatment After Acid Leaching of Heat-Treated Positive Electrode Scrap)

Reference Example 4

In Reference Example 4, 100 g of the positive electrode scrap obtained by the same method (i.e., heat treatment) as in Reference Example 2 and 800 g of distilled water were mixed, and 184.3 g of a sulfuric acid ($H_2SO_4$) aqueous solution containing 98 wt. % of sulfuric acid was added.

Further, 100 g of distilled water was added, and 50 g of hydrogen peroxide ($H_2O_2$) was gradually added thereto, and then the mixture was stirred at 80° C. for 2 hours to obtain a leachate.

A 2M sodium hydroxide (NaOH) aqueous solution was gradually added dropwise to 250 cc of the leachate. After reaching the pH of Table 2 below, filtration was performed using a filter paper containing pores having a diameter of 0.25 μm.

Then, the results of analyzing the filtrate by ICP-OES are shown in Table 1 below.

TABLE 1

| Reached pH | Analysis result (ppm) | | | | | | |
|---|---|---|---|---|---|---|---|
| | Al | Co | Fe | Li | Mn | Na | Ni |
| Initial stock solution | 130 | 9400 | 10 | 5700 | 8700 | 60 | 26500 |
| pH2 | 95 | 7180 | 6 | 4180 | 6700 | 9590 | 21750 |
| pH2.55 | 95 | 7020 | 7 | 4095 | 6590 | 10550 | 21500 |
| pH3.79 | 40 | 6890 | 5 | 4110 | 6450 | 11100 | 21270 |
| pH5.3 | 2 | 6770 | 2 | 4005 | 6350 | 10830 | 20310 |
| pH6.05 | <2 | 6840 | <2 | 3960 | 6290 | 10790 | 20650 |

According to Table 1, it can be seen that when the electrode active material is leached with acid and then subjected to an alkali treatment, almost all of the aluminum (Al) is removed and, at the same time, a significant amount of metal components is lost.

Here, metal aluminum (Al) may have the following reaction pathway in an aqueous sodium hydroxide (NaOH) solution.

$$2Al+3NaOH \rightarrow Al(OH)_3+3NA^+$$

In particular, when treated with a sodium hydroxide (NaOH) aqueous solution after leaching with sulfuric acid, the following reaction is possible.

$$Al_2(SO_4)+6NaOH \rightarrow 3Na_2SO_4$$

The higher the content of metallic aluminum (Al) in the leachate, the higher the required amount of sodium hydroxide (NaOH) aqueous solution. By the way, sodium hydroxide (NaOH) provides hydroxide ion (OH–) to induce precipitation of aluminum (Al), but there is a problem that sodium ion (Na+), which is a counter ion, remains in the leachate. Thus, it can be seen that the sodium (Na) component is greatly increased in proportion to the addition amount of the sodium hydroxide (NaOH) aqueous solution.

In particular, for each metal, based on the content (100%) of the initial stock solution, when comparing the contents of the filtrate after reaching pH 6.05, 28% of cobalt (Co), 31% of lithium (Li) and 22% of nickel were lost.

This means that, in the process of adding a sodium hydroxide (NaOH) aqueous solution to the filtrate after acid leaching, metal components of the positive electrode active material (i.e., Li, Ni, Co, and Mn) were also co-precipitated together with aluminum.

(that is, containing 1150 ppm of Al after separation by a physical method), and then stirred at room temperature for 10 minutes. After stirring, the mixture was allowed to stand for 10 minutes, and then the supernatant was taken and filtered with a 0.45 μm syringe filter.

After the filtering, the filtrate was analyzed by ICP-OES, and the analysis results are shown as the leaching rate in Table 2 below.

Reference Example 6

In Reference Example 6, 5 g of the positive electrode active material scrap obtained by the same method as in Reference Example 1 (that is, containing 1150 ppm of Al after separation by a physical method) was heat-treated at 550° C. for 180 minutes.

Other steps were performed in the same manner as in Reference Example 4 to obtain the filtrate of Reference Example 5, which was then analyzed by ICP-OES and the results are shown in Table 2 below.

TABLE 2

| | Heat treatment before alkali treatment | Al | Co | Li | Mn | Ni |
|---|---|---|---|---|---|---|
| Reference Example 5 | X | 18.2 wt. % | <5 ppm | 0.79 wt. % | <5 ppm | <5 ppm |
| Reference Example 6 | O | 18.4 wt. % | 0.72 wt. % | 14.4 wt. % | <5 ppm | 2.7 wt. % |

From these results, it can be seen that it is desirable to selectively remove aluminum before acid leaching.

Experimental Example 3 (Problems Caused by Heat Treatment Before Alkali Treatment of Physically Separated Positive Electrode Active Material)

When the physically separated positive active material is heat treated, the combustion of the conductive agent and PVDF binder progresses. Generally, the combustion progresses in the range of 450 to 550 degrees. These organic substances can be oxidized/removed by heat treatment, but even after heat treatment, the aluminum particles remain as they are. Therefore, the aluminum particles (Al particles) have no choice but to be dissolved (leached) in a subsequent strong acid leaching step, and alkali treatment of the leachate is required.

Reference Example 5

In Reference Example 5, a sodium hydroxide aqueous solution containing 8 wt. % of sodium hydroxide (NaOH) was added to 5 g of a positive electrode active material scrap obtained by the same method as in Reference Example 1

According to Table 2, it can be seen that the leaching rates of aluminum (Al) in Reference Examples 5 and 6 are substantially identical, but there is a significant difference in the leaching rate of metal components (i.e., Li, Ni, Co, and Mn) of the positive electrode active material.

Since the conductive material (e.g., carbon black) and the binder (e.g., PVDF) are oxidized and decomposed during heat treatment in the presence of oxygen, the binder is not contained in the positive electrode active material scrap by heat treatment. On the other hand, the binder is contained in the positive active material scrap separated by a physical method.

However, in Reference Example 6, the positive electrode active material scrap separated by a physical method was heat-treated, and the binder would be decomposed and removed in this process.

Since binders such as PVDF are generally hydrophobic, the binder is removed by heat treatment in Reference Example 5 and then the metal components (i.e., Li, Ni, Co, and Mn) of the positive electrode active material have a relatively increased hydrophilicity, so it would be leached together with aluminum (Al) during alkali treatment.

From these results, it can be seen that it is necessary to avoid heat treatment before alkali treatment.

Experimental Example 4 (Problems Caused by Distilled Water Treatment of the Positive Active Material Screened After Comminution)

Comparative Example 1 (Ref)

A waste positive electrode containing $LiNi_{0.6}Co_{0.2}Mn_{0.2}O_2$ as a positive electrode active material was prepared, and the waste positive electrode was comminuted by a shredder, a high-speed mill, and an ultra-high-speed mill in that order, and then screened by a particle size screening device equipped with a 60 mesh sieve (243 μm), and then the positive electrode active material was separated and screened.

Here, the driving conditions of each device are as follows:

Comminution machine: Shredder (HANKOOK Power Machine Engineering, feeding a positive electrode scrap at a speed of 150 kg per hour), motor frequency 10 Hz High-speed milling machine: Cutter mill (HANKOOK Power Machine Engineering, feeding a positive electrode scrap at a speed of 50 kg per hour): motor frequency 800 Hz Ultra-high-speed milling machine: Pin mill (=fine impact mill), (HANKOOK Power Machine Engineering, feeding at a speed of 30 kg per hour), motor frequency 5000 Hz Particle screening device: Twist Screen (HANKOOK Power Machine Engineering, feeding at a speed of 15 kg per hour) equipped with a 30 mesh sieve in the first stage and a 60 mesh sieve in the second stage.

The result of analysis by ICP-OES showed that the Al content was 0.0405 wt. % and the Li content was 6.8 wt. % in the separated and screened positive electrode active material powder (100 wt. %).

When comparing the aluminum content in the separated and screened positive active material powder with the aluminum content of the filtrate after distilled water treatment and acid leaching, it can be seen that distilled water treatment alone is insufficient to remove aluminum, and other treatment methods are required.

Experimental Example 5 (Problems Caused by Acid Treatment of the Positive Active Material Screened After Comminution)

Comparative Examples 2 and 3

In Comparative Examples 2 and 3, a hydrochloric acid aqueous solution having a hydrochloric acid concentration of 10 wt. % and an oxalic acid aqueous solution having an oxalic acid concentration of 10 wt. % were used instead of the distilled water of Comparative Example 1, the stirring time was set to 60 minutes, and the stirring temperature was changed to 60° C.

Other steps were performed in the same manner as in Comparative Example 1 to obtain the filtrates of Examples 8 and 9, respectively, and the results of ICP-OES analysis are shown in Table 4 below.

TABLE 4

| | Treatment condition | | Analysis result (leaching rate) | | | | |
| | | Treatment | | | | | |
| Treatment solution | Treatment temperature and time | Al (wt. %) | Li (wt. %) | Ni (ppm) | Co (ppm) | Mn (ppm) |
| --- | --- | --- | --- | --- | --- | --- | --- |
| Comparative Example 2 | 10 wt. % hydrochloric acid aqueous solution | 60 min, 60° C. | 34.57 | 9.76 | 7.26 | 7.56 | 6.17 |
| Comparative Example 3 | 10 wt. % oxalic acid aqueous solution | 60 min, 60° C. | 38.27 | 6.21 | 0.59 | 0.24 | 0.11 |

50 g of distilled water was added to 5 g of the separated and screened positive active material powder, and then stirred at room temperature (25° C.) for 10 minutes. After stirring, the mixture was allowed to stand for 10 minutes, and then the supernatant was taken and filtered with a 0.45 μm syringe filter.

After the filtering, the filtrate was analyzed by ICP-OES, and the analysis results are shown as the leaching rate in Table 3 below.

TABLE 3

| | Al (wt. %) | Li (wt. %) | Ni (ppm) | Co (ppm) | Mn (ppm) |
| --- | --- | --- | --- | --- | --- |
| Comparative Example 1 (Ref.) | 1.23 | 0.61 | <5 | <5 | <5 |

According to Table 4, it can be seen that when acid treatment is used instead of distilled water treatment, not only the amount of leaching of aluminum (Al), which is a current collector component, is increased, but also the amount of leaching of the metal components (i.e., Li, Ni, Co, and Mn) of the positive electrode active material is significantly increased.

Comparative Example 4

In Comparative Example 4, similarly to Comparative Example 2, a hydrochloric acid aqueous solution having a hydrochloric acid concentration of 10 wt. % was added, then 0.05 g of hydrogen peroxide was added, and then the mixture was stirred at 60° C. for 60 minutes.

Other steps were performed in the same manner as in Comparative Example 2 to obtain the filtrate of Comparative Example 4, and the results of ICP-OES analysis are shown in Table 5 below.

For reference, the results of Comparative Example 2 are also shown in Table 5 below.

TABLE 5

| | Treatment condition | | Analysis result (leaching rate) | | | | |
|---|---|---|---|---|---|---|---|
| | Treatment solution | Treatment temperature and time | Al (wt. %) | Li (wt. %) | Ni (wt. %) | Co (wt. %) | Mn (wt. %) |
| Comparative Example 3 | 10 wt. % hydrochloric acid aqueous solution | 60 min, 60° C. | 34.57 | 9.76 | 7.26 | 7.56 | 6.17 |
| Comparative Example 4 | 10 wt. % hydrochloric acid aqueous solution and hydrogen peroxide | 60 min, 60° C. | 41.13 | 9.71 | 7.04 | 7.57 | 6.14 |

According to Table 5, it can be seen that when treated with a reducing agent after acid treatment, the amount of leaching of aluminum (Al), which is a component of the current collector, is increased, as compared with the case where only the acid treatment is performed.

Experimental Example 6 (Alkali Treatment of the Positive Active Material Screened After Comminution)

Examples 1 to 4 (Alkali Treatment Concentration Test)

In Examples 1 to 4, a sodium hydroxide aqueous solution having a sodium hydroxide concentration of 1 wt. %, 3 wt. %, 5 wt. %, and 10 wt. % was used, respectively, instead of the distilled water of Comparative Example 1.

Other steps were performed in the same manner as in Comparative Example 1 to obtain the filtrates of Examples 1 to 4, respectively, and the results of ICP-OES analysis are shown in Table 6 below.

TABLE 6

| | Treatment condition | Analysis result (leaching rate) | | | | |
|---|---|---|---|---|---|---|
| | Treatment solution | Al (wt. %) | Li (wt. %) | Ni (ppm) | Co (ppm) | Mn (ppm) |
| Example 1 | 1 wt. % NaOH aqueous solution | 3.70 | 0.76 | <5 | <5 | <5 |
| Example 2 | 3 wt. % NaOH aqueous solution | 8.64 | 0.81 | <5 | <5 | <5 |
| Example 3 | 5 wt. % NaOH aqueous solution | 14.81 | 0.79 | <5 | <5 | <5 |
| Example 4 | 10 wt. % NaOH aqueous solution | 20.99 | 0.82 | <5 | <5 | <5 |

According to Table 6, it can be seen that in Examples 1 to 4, while there is nearly no change in the amount of leaching of metal components (i.e., Li, Ni, Co, and Mn) of the positive electrode active material, the amount of leaching of aluminum (Al), which is a current collector component, increased, as compared with the distilled water treatment (Comparative Example 1).

Further, it can be seen that in Examples 1 to 4, the amount of leaching of metal components (i.e., Li, Ni, Co, and Mn) of the positive electrode active material is significantly reduced, as compared with the acid treatment (Comparative Examples 2 to 4).

From these results, it can be seen that the positive active material screened after comminution is subjected to alkali treatment to selectively remove aluminum (Al), which is a current collector component, and then an acid is added thereto to leach the metal components (i.e., Li, Ni, Co, and Mn) of the positive active material to recycle the metal component of the positive electrode active material without an additional aluminum (Al) removing step such as heat treatment.

On the other hand, in Table 2, it can be seen that as the alkali concentration increases, the amount of leaching of aluminum (Al) increases. With reference to these results, the amount of leaching of the metal component of the positive electrode active material can be controlled by changing the alkali concentration.

Example 5 (Stirring Time Test)

In Example 5, a sodium hydroxide aqueous solution having a sodium hydroxide concentration of 5 wt. % was used instead of the distilled water of Comparative Example 1, and the stirring time was changed to 60 minutes.

Other steps were performed in the same manner as in Comparative Example 1 to obtain the filtrate of Example 5, and the results of ICP-OES analysis are shown in Table 7 below.

For reference, the results of Example 3, in which a sodium hydroxide aqueous solution having a sodium oxide concentration of 5 wt. % was used, but the stirring time was changed to 10 minutes, are also shown in Table 7 below.

TABLE 7

| | Treatment condition | | Analysis result | | | | |
| --- | --- | --- | --- | --- | --- | --- | --- |
| | Treatment solution | Treatment time | Al (wt. %) | Li (wt. %) | Ni (ppm) | Co (ppm) | Mn (ppm) |
| Example 3 | 5 wt. % NaOH aqueous solution | 10 min | 14.81 | 0.79 | <5 | <5 | <5 |
| Example 5 | 5 wt. % NaOH aqueous solution | 60 min | 23.46 | 0.85 | <5 | <5 | <5 |

According to Table 7, it can be seen that when the alkali concentration is identical, as the treatment (stirring) time of the alkaline solution is higher, the amount of leaching of the metal components (i.e., Li, Ni, Co, and Mn) of the positive electrode active material hardly changes, while the amount of leaching of aluminum (Al), which is a current collector component, is increased.

Example 6 (Stirring Temperature Test)

In Example 6, a sodium hydroxide aqueous solution having a sodium hydroxide concentration of 5 wt. % was used instead of the distilled water of Comparative Example 1, and the stirring time was set to 60 minutes, and the stirring temperature was changed to 60° C.

Other steps were performed in the same manner as in Comparative Example 1 to obtain the filtrate of Example 6, and the results of ICP-OES analysis are shown in Table 8 below.

For reference, the results of Example 5, in which a sodium hydroxide aqueous solution having a sodium hydroxide concentration of 5 wt. % was used, the stirring time was set to 60 minutes, and the stirring temperature was set to room temperature, is also shown in Table 8 below.

According to Table 8, it can be seen that when the alkali concentration and the treatment time are identical, as the treatment (stirring) temperature of the alkaline solution is higher, the amount of leaching of the metal components (i.e., Li, Ni, Co, and Mn) of the positive electrode active material hardly changes, and the amount of leaching of aluminum (Al) which is the current collector component is increased.

Example 7 (Ultrasonic Test)

In Example 7, a sodium hydroxide aqueous solution having a sodium hydroxide concentration of 5 wt. % was used instead of the distilled water of Comparative Example 1, and a frequency of 20-40 kHz was applied for 60 minutes using an ultrasonic cleaner during stirring.

Other steps were performed in the same manner as in Comparative Example 1 to obtain the filtrate of Example 7, and the results of ICP-OES analysis are shown in Table 9 below.

For reference, the results of Example 5, in which a sodium hydroxide aqueous solution having a sodium hydroxide concentration of 5 wt. %, a stirring time was set to 60 minutes, and a stirring temperature was set to room temperature, are also shown in Table 9 below.

TABLE 8

| | Treatment condition | | | | | | |
| --- | --- | --- | --- | --- | --- | --- | --- |
| | | Treatment | | Analysis result | | | |
| | Treatment solution | time and temperature | Al (wt. %) | Li (wt. %) | Ni (ppm) | Co (ppm) | Mn (ppm) |
| Exmaple 5 | 5 wt. % NaOH aqueous solution | 60 min, room temperature | 23.46 | 0.85 | <5 | <5 | <5 |
| Example 6 | 5 wt. % NaOH aqueous solution | 60 min, 60° C. | 29.63 | 1.06 | <5 | <5 | <5 |

TABLE 9

| | Treatment condition | | Analysis result | | | | |
| | | Treatment | | | | | |
| | Treatment solution | time and temperature | Al (wt. %) | Li (wt. %) | Ni (ppm) | Co (ppm) | Mn (ppm) |
|---|---|---|---|---|---|---|---|
| Example 5 | 5 wt. % NaOH aqueous solution | 60 min, room temperature | 23.46 | 0.85 | <5 | <5 | <5 |
| Example 7 | 5 wt. % NaOH aqueous solution | 60 min, room temperature, ultrasonic treatment | 23.46 | 0.86 | <5 | <5 | <5 |

According to Table 9, it can be seen that when the alkali concentration, temperature, and treatment time are identical, there is nearly no difference depending on the presence/absence of the ultrasonic treatment.

Examples 8 and 9 (Quantitative Test of Alkaline Solution)

In Examples 8 and 9, 50 g of sodium hydroxide aqueous solution having a sodium hydroxide concentration of 10 wt. % and 100 g of sodium hydroxide aqueous solution having a sodium hydroxide concentration of 5 wt. % were used instead of 50 g of distilled water of Comparative Example 1, respectively.

Other steps were performed in the same manner as in Comparative Example 1 to obtain the filtrates of Examples 8 and 9, respectively, and the results of ICP-OES analysis are shown in Table 10 below.

Recovery Test of Metal Components

Example 10

Using the same process as in Comparative Example 1, the waste positive electrode was comminuted and then the positive electrode active material was separated and screened.

1000 g of a sodium hydroxide aqueous solution containing 10 wt. % sodium hydroxide was added to 100 g of the positive electrode active material powder, and then stirred at 80° C. for 2 hours. After stirring, the mixture was allowed to stand for 10 minutes, and then the supernatant was taken and filtered through a 0.45 μm syringe filter.

After the filtering, the solid remaining after filtration was recovered and added to a separate beaker, 184.3 g of a sulfuric acid aqueous solution having a sulfuric acid concentration of 98 wt. % was added, and then 100 g of distilled water was further added, and then stirred at 80° C. for 2 hours.

After stirring, the mixture was allowed to stand for 10 minutes, and then the supernatant was taken and filtered with

TABLE 10

| | Treatment condition | | Analysis result | | | | |
| | | Treatment | | | | | |
| | Treatment solution | temperature and time | Al (wt. %) | Li (wt. %) | Ni (ppm) | Co (ppm) | Mn (ppm) |
|---|---|---|---|---|---|---|---|
| Example 8 | 10 wt. % NaOH aqueous solution 50 g | 60 min, 60° C. | 32.10 | 1.04 | <5 | <5 | <5 |
| Example 9 | 5 wt. % NaOH aqueous solution 100 g | 60 min, 60° C. | 29.63 | 1.09 | <5 | <5 | <5 |

According to Table 10, it can be seen that when the amount of alkaline solution including excess water is higher even if the absolute amount of alkali substances in the alkaline solution is identical at the same treatment (stirring) temperature and time, there is nearly no change in the amount of leaching of metal components (i.e., Li, Ni, Co, and Mn) of the positive electrode active material, and the amount of leaching of aluminum (Al), which is a current collector component, is reduced.

a 2.5 μm syringe filter. The solid remaining after filtration was dried, and as a result, a dry weight of 45 g was confirmed.

Separately, the results of analyzing the filtrate by ICP-OES are shown in Table 11 below.

Comparative Example 2

The waste positive electrode containing $LiNi_{0.6}Co_{0.2}Mn_{0.2}O_2$ as a positive electrode active material was separated from the waste battery, and then the temperature of the waste positive electrode was raised to 550° C. at a temperature increase rate of 2° C./min and then heat-treated for 3 hours, and then the positive electrode active material layer was scraped off from the current collector to obtain a positive electrode active material scrap.

800 g of distilled water was added to 100 g of the positive electrode active material powder, and 184.3 g of a sulfuric acid aqueous solution having a sulfuric acid concentration of 98 wt. % was added, and then 100 g of distilled water was further added, and then stirred at 80° C. for 2 hours.

After stirring, the mixture was allowed to stand for 10 minutes, and then the supernatant was taken and filtered with a 2.5 μm syringe filter. The solid left on the syringe filter was dried, and as a result, a dry weight of 44 g was confirmed.

Separately from that, the results of analyzing the filtrate by ICP-OES are shown in Table 11 below.

Comparative Example 3

Using the same process as in Comparative Example 1, the positive electrode active material layer was scraped off from the current collector of the waste positive electrode to obtain a positive electrode active material powder.

800 g of distilled water was added to 100 g of the positive electrode active material powder, and 184.3 g of a sulfuric acid aqueous solution having a sulfuric acid concentration of 98 wt. % was added, and then 100 g of distilled water was further added, and then stirred at 80° C. for 2 hours.

After stirring, the mixture was allowed to stand for 10 minutes, and then the supernatant was taken and filtered with a 2.5 μm syringe filter. The solid left on the syringe filter was dried, and as a result, a dry weight of 62 g was confirmed.

Separately from that, the results of analyzing the filtrate by ICP-OES are shown in Table 11 below.

TABLE 11

| | Comparative Example 2 | Comparative Example 3 | Comparative Example 10 |
|---|---|---|---|
| Li (ppm) | 5980 | 5740 | 5990 |
| Ni (ppm) | 23750 | 16370 | 22990 |
| Mn (ppm) | 5 | 35 | 10 |
| Co (ppm) | 5990 | 5320 | 5940 |
| filtration residue (g) | 44 | 62 | 45 |

Looking at Table 11, it can be seen that the metal component of the positive electrode active material can be effectively recovered in Example 10, as compared with Comparative Examples 2 and 3.

Specifically, the heat treatment of the waste positive electrode of Comparative Example 2 has the main purpose of oxidizing and removing the remaining binder and conductive material components, but the disadvantage is that additional energy cost and time due to heat treatment are further incurred.

Comparative Example 3 showed that by omitting the heat treatment step in Comparative Example 2, the amount of leaching of the metal component (i.e., Li, Ni, Co, and Mn) of the positive electrode active material was significantly reduced as compared with Comparative Example 2, particularly, only about 69% of Ni was recovered as compared with Comparative Example 2.

On the other hand, Example 10 showed that the heat treatment step of Comparative Example 2 was replaced with an alkali treatment step, but the amount of leaching of the main components is superior to that of Comparative Example 3 and similar to that of Comparative Example 2.

This means that by replacing the commonly known heat treatment step with an alkali treatment step, the hydrophobic binder component was decomposed and at the same time, aluminum (Al), which is a current collector component, was dissolved and removed.

In addition, after the alkali treatment, carbon type organic components such as conductive materials are removed by acid leaching without additional heat treatment, and metal components (i.e., Li, Ni, Co, and Mn) of the positive electrode active material can be selectively leached.

Furthermore, similarly to Examples 1 to 10, the alkali concentration, stirring time and temperature, presence/absence of ultrasonic treatment, the total amount of alkali solution, and the like can be adjusted, thereby more effectively removing aluminum (Al) and increasing the recovery rate of metal components (i.e., Li, Ni, Co, and Mn) of the positive electrode active material.

Industrial Applicability

The one embodiment utilizes the leaching reaction speed, and the electrode active material obtained by comminuting and screening the waste electrode shows hydrophobicity on the powder surface due to the polymer binder component, and thus the dissolution rate in the alkaline solution is slow, and the current collector components (particularly, aluminum) can be selectively removed in an alkaline solution.

When an acid is added in a state where the current collector component (particularly, aluminum) is selectively removed in this way, the metal components (particularly, Ni, Co, Mn, Li) of the electrode active material can be recovered with a high recovery rate without an additional impurity (particularly, aluminum) removing step.

The invention claimed is:

1. A method of removing aluminum from a waste electrode, the method comprising the steps of:
  comminuting the waste electrode containing a waste current collector and an electrode active material;
  screening the comminuted waste electrode to collect the electrode active material; and
  mixing the electrode active material and an alkaline solution to remove aluminum impurities in the electrode active material
  wherein the step of comminuting the waste electrode comprises sequentially comminuting the waste electrode using a shredder, a first milling machine having a first speed, and a second milling machine having a second speed, and the second speed is faster than the first speed.

2. The method according to claim 1, wherein the electrode active material is a positive electrode active material containing at least one transition metal of nickel (Ni), cobalt (Co) and manganese (Mn), and lithium (Li).

3. The method according to claim 1, wherein the alkaline solution is an aqueous solution containing sodium hydroxide (NaOH), potassium hydroxide (KOH), ammonium hydroxide (NH₄OH), or a mixture of two or more thereof.

4. The method according to claim 3, wherein the alkaline solution is a sodium hydroxide aqueous solution containing 2 to 15% by weight of sodium hydroxide (NaOH) and a remainder of water in the total amount of the sodium hydroxide aqueous solution.

5. The method according to claim 1, wherein the mixing of the electrode active material and the alkaline solution is performed at a temperature range of 15 to 80° C.

6. The method according to claim 1, wherein the alkaline solution is mixed in an amount of 500 to 900 parts by weight based on 100 parts by weight of the electrode active material.

7. The method according to claim 1, wherein the mixing of the electrode active material and the alkaline solution is performed for 5 to 100 minutes.

8. The method according to claim 1, wherein ultrasonic waves are applied when mixing the electrode active material and the alkaline solution.

9. The method according to claim 1, wherein the step of screening the comminuted waste electrode to collect the electrode active material comprises collecting the electrode active material from the comminuted waste electrode by using a particle size screening device equipped with a 25 to 70 mesh sieve.

10. The method of claim 1, wherein the first milling machine is a cutter mill and the second milling machine is a pin mill.

11. The method of claim 1, wherein the first speed is in a range of 700 to 900 Hz and the second speed is in a range of 4000 to 6000 Hz.

\* \* \* \* \*